US010037715B2

(12) United States Patent
Toly et al.

(10) Patent No.: US 10,037,715 B2
(45) Date of Patent: Jul. 31, 2018

(54) DETECTING INSERTION OF NEEDLE INTO SIMULATED VESSEL USING A CONDUCTIVE FLUID

(71) Applicant: Simulab Corporation, Seattle, WA (US)

(72) Inventors: Christopher C. Toly, Seattle, WA (US); Douglas J. Beighle, Redmond, WA (US); Aaron M. Erbeck, Seattle, WA (US); Tyler L. Hartley, Seattle, WA (US); Jay A. Borseth, Seattle, WA (US)

(73) Assignee: Simulab Corporation, Seattle, WA (US)

( * ) Notice: Subject to any disclaimer, the term of this patent is extended or adjusted under 35 U.S.C. 154(b) by 765 days.

(21) Appl. No.: 14/516,420

(22) Filed: Oct. 16, 2014

(65) Prior Publication Data
US 2015/0104773 A1 Apr. 16, 2015

Related U.S. Application Data

(60) Provisional application No. 61/891,505, filed on Oct. 16, 2013.

(51) Int. Cl.
*G09B 23/30* (2006.01)
*G09B 23/28* (2006.01)
*G09B 23/32* (2006.01)

(52) U.S. Cl.
CPC ........... *G09B 23/303* (2013.01); *G09B 23/28* (2013.01); *G09B 23/285* (2013.01); *G09B 23/30* (2013.01); *G09B 23/32* (2013.01)

(58) Field of Classification Search
None
See application file for complete search history.

(56) References Cited

U.S. PATENT DOCUMENTS 2,103,021 A 12/1937 Salsman
2,689,415 A 9/1954 Haver
(Continued)

FOREIGN PATENT DOCUMENTS

AU 2002236681 1/2006
CA 2426319 5/2002
(Continued)

OTHER PUBLICATIONS

Advanced Surgical, Inc., Catalog, Princeton, N.J., at least as early as Apr. 1996.
(Continued)

*Primary Examiner* — James Hull
(74) *Attorney, Agent, or Firm* — Lee & Hayes, PLLC

(57) ABSTRACT

A medical trainer simulator includes a plurality of simulated vessels filled with a conductive fluid representing, for example, veins or arteries. While performing a procedure using the medical trainer, a person inserts a medical instrument, e.g., a needle or scalpel, into a selected vessel, causing the medical instrument to contact the conductive fluid. A circuit board detects when a circuit is thus created by detecting an electrical current flowing through the medical instrument and the conductive fluid it has contacted. A software program executing on a computer excludes any phantom circuit occurring when the medical instrument contacts conductive fluid from a previous procedure that is not within one of the vessels. A phantom circuit is detected if the resistance of the resulting circuit exceeds a predetermined threshold. The computer visually and/or audibly indicates whether the correct vessel was pierced or excized by the medical instrument.

20 Claims, 5 Drawing Sheets

(56) References Cited

U.S. PATENT DOCUMENTS

Figure 1:
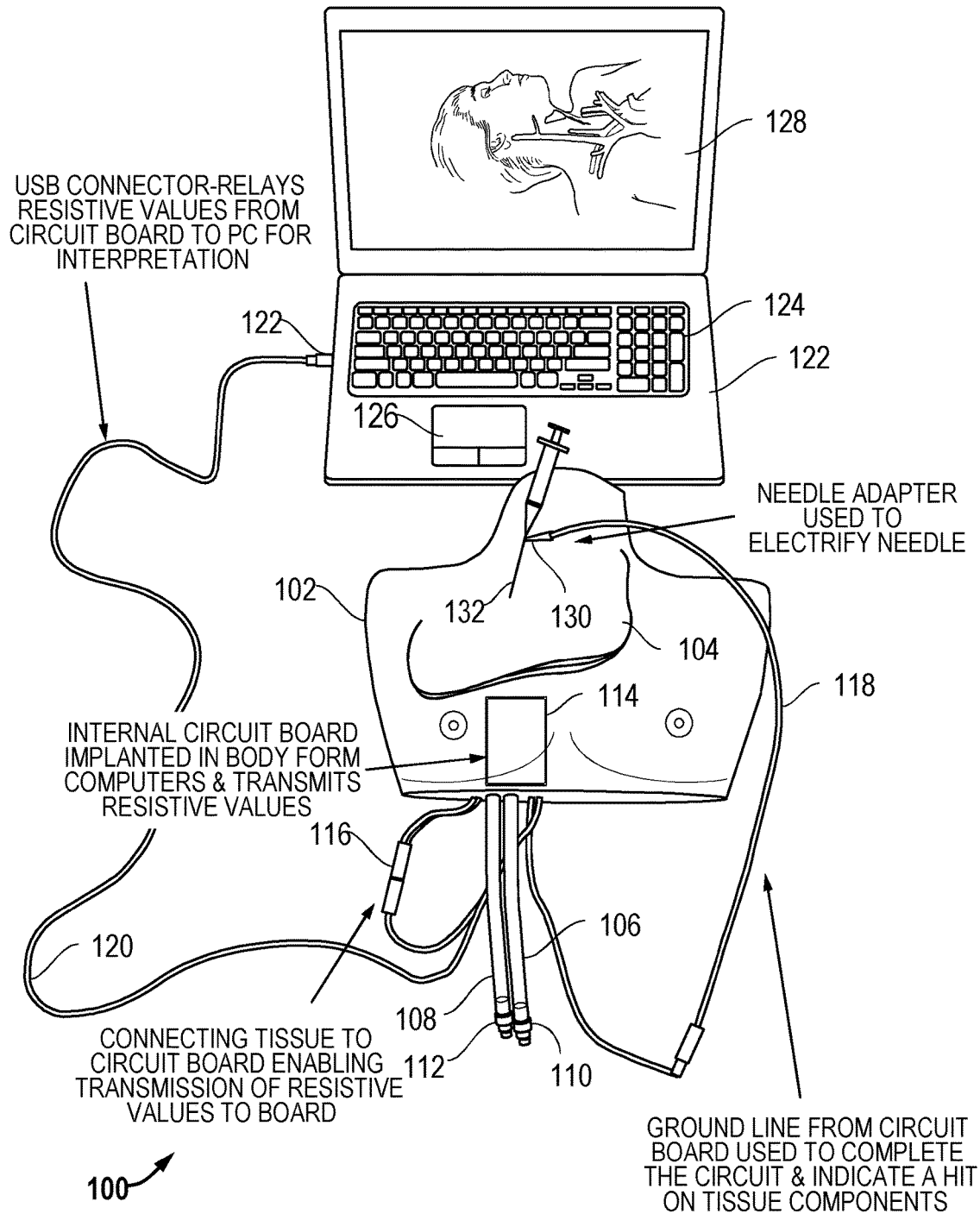

| | | |
|---|---|---|
| 2,763,070 A | 9/1956 | McCormick |
| 2,871,579 A | 2/1959 | Niiranen et al. |
| 2,995,832 A | 8/1961 | Alderson |
| 3,426,449 A | 2/1969 | Van Noy, Jr. |
| 3,704,529 A | 12/1972 | Cioppa |
| 3,947,974 A | 4/1976 | Gordon et al. |
| 4,134,218 A | 1/1979 | Adams et al. |
| 4,273,682 A | 6/1981 | Kanamori |
| 4,323,350 A | 4/1982 | Bowden, Jr. |
| 4,360,345 A | 11/1982 | Hon |
| 4,439,162 A | 3/1984 | Blaine |
| 4,459,113 A | 7/1984 | Boscaro Gatti et al. |
| 4,481,001 A | 11/1984 | Graham et al. |
| 4,596,528 A | 6/1986 | Lewis et al. |
| 4,605,373 A | 8/1986 | Rosen |
| 4,687,885 A | 8/1987 | Talmage, Jr. et al. |
| 4,767,333 A | 8/1988 | Born |
| 4,773,865 A | 9/1988 | Baldwin |
| 4,789,340 A | 12/1988 | Zikria |
| 4,872,841 A | 10/1989 | Hamilton et al. |
| 4,898,173 A | 2/1990 | Daglow et al. |
| 4,907,973 A | 3/1990 | Hon |
| 5,051,605 A | 9/1991 | D'Antonio et al. |
| 5,090,910 A | 2/1992 | Narlo |
| 5,104,328 A | 4/1992 | Lounsbury |
| 5,112,228 A | 5/1992 | Zouras |
| 5,137,458 A | 8/1992 | Ungs et al. |
| 5,149,270 A | 9/1992 | McKeown |
| 5,175,214 A | 12/1992 | Takaya et al. |
| 5,205,286 A | 4/1993 | Soukup et al. |
| 5,211,165 A | 5/1993 | Dumoulin et al. |
| 5,215,469 A | 6/1993 | Kohnke et al. |
| 5,295,694 A | 3/1994 | Levin |
| 5,320,537 A | 6/1994 | Watson |
| 5,322,729 A | 6/1994 | Heeter et al. |
| 5,425,644 A | 6/1995 | Szinicz |
| 5,518,406 A | 5/1996 | Waters |
| 5,518,407 A | 5/1996 | Greenfield et al. |
| 5,573,501 A | 11/1996 | Ruscito et al. |
| 5,589,639 A | 12/1996 | D'Antonio et al. |
| 5,589,838 A | 12/1996 | McEwan |
| 5,609,485 A | 3/1997 | Bergman et al. |
| 5,609,615 A | 3/1997 | Sanders et al. |
| 5,620,326 A | 4/1997 | Younker |
| 5,722,836 A | 3/1998 | Younker |
| 5,731,587 A | 3/1998 | DiBattista et al. |
| 5,734,418 A | 3/1998 | Danna |
| 5,754,313 A | 5/1998 | Pelchy et al. |
| 5,775,916 A | 7/1998 | Cooper et al. |
| 5,800,178 A | 9/1998 | Gillio |
| 5,823,787 A | 10/1998 | Gonzalez et al. |
| 5,832,772 A | 11/1998 | McEwan |
| 5,853,292 A | 12/1998 | Eggert et al. |
| 5,855,553 A | 1/1999 | Tajima et al. |
| 5,883,591 A | 3/1999 | McEwan |
| 5,947,743 A | 9/1999 | Hasson |
| 5,951,301 A | 9/1999 | Younker |
| 5,967,790 A | 10/1999 | Stover et al. |
| 5,983,552 A | 11/1999 | Nelson |
| 6,074,213 A | 6/2000 | Hon |
| 6,095,148 A | 8/2000 | Shastri et al. |
| 6,139,489 A | 10/2000 | Wampler et al. |
| 6,211,904 B1 | 4/2001 | Adair et al. |
| 6,234,804 B1 | 5/2001 | Yong |
| 6,256,012 B1 | 7/2001 | Devolpi |
| 6,270,491 B1 | 8/2001 | Toth et al. |
| 6,273,728 B1 | 8/2001 | van Meurs et al. |
| 6,361,323 B1 | 3/2002 | Beach et al. |
| 6,428,323 B1 | 8/2002 | Pugh |
| 6,436,035 B1 | 8/2002 | Toth et al. |
| 6,443,735 B1 | 9/2002 | Eggert et al. |
| 6,527,704 B1 | 3/2003 | Chang et al. |
| 6,532,379 B2 | 3/2003 | Stratbucker |
| 6,540,390 B2 | 4/2003 | Toth et al. |
| 6,544,041 B1 | 4/2003 | Damadian |
| 6,575,757 B1 | 6/2003 | Leight et al. |
| 6,659,776 B1 | 12/2003 | Aumann et al. |
| 6,750,769 B1 | 6/2004 | Smith |
| 6,773,263 B2 | 8/2004 | Nicholls et al. |
| 6,780,016 B1 | 8/2004 | Toly |
| 6,857,878 B1 | 2/2005 | Chosack et al. |
| 7,037,006 B2 | 5/2006 | Chapman |
| 7,114,954 B2 | 10/2006 | Eggert et al. |
| 7,321,228 B2 | 1/2008 | Govari |
| 7,665,995 B2 | 2/2010 | Toly |
| 7,850,454 B2 | 12/2010 | Toly |
| 7,857,626 B2 | 12/2010 | Toly |
| 8,162,668 B2 | 4/2012 | Toly |
| 8,323,029 B2 | 12/2012 | Toly |
| 8,556,635 B2 | 10/2013 | Toly |
| 2001/0000187 A1 | 4/2001 | Peckham et al. |
| 2001/0055748 A1 | 12/2001 | Bailey |
| 2002/0126501 A1 | 9/2002 | Toth et al. |
| 2002/0168618 A1 | 11/2002 | Anderson et al. |
| 2003/0051561 A1 | 3/2003 | Weiss |
| 2003/0068606 A1 | 4/2003 | Nicholls et al. |
| 2003/0073060 A1 | 4/2003 | Eggert et al. |
| 2004/0115607 A1 | 6/2004 | Pastrick et al. |
| 2004/0126746 A1* | 7/2004 | Toly ............... G09B 23/28 434/262 |
| 2004/0142314 A1 | 7/2004 | Hasson et al. |
| 2004/0214150 A1 | 10/2004 | Eggert et al. |
| 2007/0178429 A1 | 8/2007 | Bell |
| 2008/0065006 A1* | 3/2008 | Roger ............... A61M 1/16 604/65 |
| 2014/0162232 A1* | 6/2014 | Yang ............... G09B 23/34 434/267 |

FOREIGN PATENT DOCUMENTS

| | | |
|---|---|---|
| CH | 646538 A5 | 11/1984 |
| DE | 4212908 A1 | 10/1993 |
| EP | 0217689 A1 | 4/1987 |
| EP | 0601806 A2 | 6/1994 |
| FR | 2691826 A1 | 12/1993 |
| GB | 2277826 A | 11/1994 |
| WO | WO9314483 A1 | 7/1993 |
| WO | WO9316664 A1 | 9/1993 |
| WO | WO9321619 A2 | 10/1993 |
| WO | WO9425948 A1 | 11/1994 |
| WO | WO9858358 A1 | 12/1998 |
| WO | WO0132249 A1 | 5/2001 |
| WO | WO2002038039 | 5/2002 |
| WO | WO2005051166 | 6/2005 |

OTHER PUBLICATIONS

Emergency Cricothyroidotomy, http://www.cpp.usmc.mil/schools/fmss/-Power%20Point/0410.PPT, Office Action dated May 24, 2002 in U.S. Appl. No. 09/695,380.

Everest Medical Corporation. Catalog, Minneapolis, MN, Sep. 1994.

Human Patient Simulator, Medical Education Technologies, Inc., http://www.meti.com/-home.html, Office Action dated May 24, 2002 in U.S. Appl. No. 09/695,380, Accessed on May 15, 2002 and May 17, 2002.

Limbs & Things, Product News, Newsletter, Nov. 1995, 4 pages.

Limbs & Things Ltd. Brochure, Bristol, England, Mar. 1, 1996, 18 pages.

Office Action dated Jan. 30, 2009 in U.S. Appl. No. 11/101,776.

Office Action dated Oct. 13, 2010 in U.S. Appl. No. 12/272,087.

Office Action dated Oct. 9, 2007 in U.S. Appl. No. 11/101,776.

Office Action dated Nov. 10, 2010 in U.S. Appl. No. 12/265,207.

Office Action dated Nov. 12, 2008 in U.S. Appl. No. 10/932,407.

Office Action dated Nov. 12, 2009 in U.S. Appl. No. 12/265,207.

Office Action dated Nov. 20, 2002 in U.S. Appl. No. 09/695,380.

Office Action dated Nov. 21, 2011 in U.S. Appl. No. 12/272,087.

Office Action dated Nov. 25, 2009 in U.S. Appl. No. 10/932,407.

Office Action dated Feb. 11, 2009 in U.S. Appl. No. 10/932,407.

Office Action dated Feb. 18, 2009 in U.S. Appl. No. 10/718,492.

(56) References Cited

OTHER PUBLICATIONS

Office Action dated Feb. 25, 2008 in U.S. Appl. No. 11/101,776.
Office Action dated Mar. 10, 2006 in U.S. Appl. No. 10/718,492.
Office Action dated Mar. 24, 2011 in U.S. Appl. No. 12/265,207.
Office Action dated Mar. 27, 2008 in U.S. Appl. No. 10/932,407.
Office Action dated Mar. 31, 2010 in U.S. Appl. No. 10/718,492.
Office Action dated Apr. 1, 2011 in U.S. Appl. No. 12/272,087.
Office Action dated Apr. 19, 2007 in U.S. Appl. No. 10/718,492.
Office Action dated Apr. 4, 2008 in U.S. Appl. No. 10/718,492.
Office Action dated May 24, 2002 in U.S. Appl. No. 09/695,380.
Office Action dated May 26, 2010 in U.S. Appl. No. 12/265,207.
Office Action dated Jun. 23, 2009 in U.S. Appl. No. 10/932,407.
Office Action dated Jun. 9, 2010 in U.S. Appl. No. 10/932,407.
Office Action dated Jul. 25, 2008 in U.S. Appl. No. 11/101,776.
Office Action dated Jul. 6, 2009 im U.S. Appl. No. 11/101,776.
Office Action dated Aug. 20, 2008 in U.S. Appl. No. 10/718,492.
Office Action dated Sep. 16, 2009 in U.S. Appl. No. 10/718,492.
Office Action dated Sep. 8, 2003 in U.S. Appl. No. 09/695,380.
Office Action dated Oct. 9, 2007 in U.S. Appl. No. 10/718,492.
Patient Simulator Program, http://www.cscc.edu/docs/nurs/patientsim.htm, Office Action dated May 24, 2002 in U.S. Appl. No. 09/695,380, Accessed on May 15, 2002.
Search Report dated Dec. 1, 2005 in European Application No. 01986226.7.
Search Report dated Mar. 29, 2006 in PCT Application No. PCT/US2004/035800.
Search Report dated Jun. 5, 2002 in PCT Application No. PCT/US2001/051286.
"Differential Impedance Transducers," Kaman Measuring Systems, 2004, 2 pages, <<http://www.kamansensors.com/html_pages/tech_note_differential_impedance_transducers.html>.
The Supplementary European Search Report dated Sep. 12, 2104 for European patent application No. 04796642.9, 6 pages.

"Giant Magnetic Resistive Potentiometers with Strong Potentialities," (CORDIS focus, No. 45, Oct. 2003). 2 pages, <<http://www.sensorsportal.com/HTML/Potentiometers_Projects.htm>>.
"A Low-Power Hall-Effect Switch," Sensors Magazine, Jun. 1999, Christine Graham, 3 pages Allegro MicroSystems, Inc., USA <<http://www.allegromicro.com/techpub2/3210papr.htm>>.
"Non-contact Thread Detection," (Sensor Applications, Application Story, Mar. 2002), 2 pages. <<http://www.sensorland.com/AppPage049.html>>.
Non-Final Office Action for U.S. Appl. No. 13/274,251, dated Nov. 23, 2012, Christopher C. Toly, "Phsysiological Simulator for Use as a Brachial Plexus Nerve Block Trainer", 6 pages.
Final Office Action for U.S. Appl. No. 13/274,251, dated Mar. 29, 2013, Christopher C. Toly, "Phsysiological Simulator for Use as a Brachial Plexus Nerve Block Trainer", 7 pages.
Office Action for U.S. Appl. No. 12/265,207, dated Aug. 17, 2011, Christopher C. Toly, "Medical Training Simulator Including Contact-Less Sensors", 5 pgs.
Office Action for U.S. Appl. No. 12/272,087, dated Aug. 18, 2011, Christopher C. Toly, "Medical Physiological Simulator Including a Conductive Elastomer Layer", 6 pgs.
"PNI SEN-565 Magneto-Inductive Sensor", PNI Corporation, 5464 Skylane Blvd., Santa Rosa, CA 95403-1084, Available at <<http://www.pnicorp.com>>, Mar. 2004, 1 pg.
"Technical Advances in Hall-Effect Sensing," (Product Description) Allegro.RTM. MicroSystems, Inc. Gilbert, Joe, May 2000, 6 pages.
"The Good, The Bad, and The Ugly," Target Material, Kaman Measuring Systems, 2004, 3 pages, <<http://www.kamansensors.com/html/technology/technology-tntargetmateri- al.htm>>.
"The Hall Effect," How they Work, How Sensors Work—HART Protocol, retrieved on Sep. 22, 2004, 2 pages, <<http://www.sensorland.com/HowPage046.html>>.
"Variable Impedance Transducers," Kaman Measuring Systems, 2004, 2 pages, <<http://www.kamansensors.com/html_pages/tech_note_variable_impedance_trans.html>>.

* cited by examiner

DETECTING INSERTION OF NEEDLE INTO SIMULATED VESSEL USING A CONDUCTIVE FLUID

RELATED APPLICATIONS

This application is based on a prior provisional application Ser. No. 61/891,505, filed on Oct. 16, 2013, the benefit of the filing date of which is hereby claimed under 35 U.S.C. § 119(e).

BACKGROUND

Simulated physiological structures that can provide feedback related to simulated medical procedures performed on such structures are very useful as medical training aids. As a result, the use of simulated physiological structures for training medical students and providing skill training for practicing physicians is widespread. Although cadavers have traditionally been beneficially employed for this purpose, cadavers are not always readily available and are not well suited for all types of training.

Simulated physiological structures should preferably be usable repeatedly and should provide a realistic training experience corresponding to what the trainee would expect if applying a procedure on an actual patient. Students, and even practicing physicians and nurses, often need to be tested to determine their skill level with respect to certain procedures. Since an objective standard is preferable in conducting such tests, a simulated physiological structure should include systems for providing feedback indicating how well the student or physician is performing a simulated task.

The need for such simulators should not be underestimated, because they can provide valuable training that will lead to more effective treatment of patients. For example, medical personnel who administer emergency trauma care can greatly benefit from the training achieved using a simulated physiological structure. Training in administering trauma surgical procedures, which include those procedures that are usually performed on a person who has experienced some form of severe and often life-threatening injury, is particularly beneficial. Such procedures may aid in the diagnosis of a condition, or may provide immediate life-saving care until more complete medical treatment is available. The procedures may include clearing a blocked airway or draining accumulations of fluids from internal organs. While appearing to be simple procedures, if these procedures are performed improperly, the result can worsen the patient's condition, placing the patient at an even greater peril of death. By their nature, trauma procedures are usually performed under emergency conditions in which the person administering the care is under time-related stress. It is therefore useful to provide training methods and apparatus to fully prepare students and physicians in these procedures, so that they can be performed without delay, under stressful conditions.

It should be noted that one reason why the use of a training model (either a cadaver, an animal, or a simulator) is desirable is that while anatomy follows general rules, variations based on sex, age, height, and weight are the norm. A surgical student cannot simply be provided directions such as "make an incision four inches long and two inches deep, starting at the navel." Normal variations such as the amount of body fat will significantly change the depth of fat tissue that must be incised to reach an internal organ. Surgeons must rely on their knowledge of general anatomy, and visual cues (i.e., the patient has low body fat, the patient has high body fat, the patient is a child, the patient is an adult, the patient is a female, etc.) to determine the correct location on a specific patient for performing a procedure. The use of cadavers, animal models, and anatomically correct simulators enable surgical students to apply their knowledge of anatomy to determine the proper position for executing a procedure.

To provide the desired level of realism, a simulated physiological structure used for training medical personnel should provide tactile sensations during a simulated procedure that faithfully portray the tactile sensations experienced during an actual procedure performed on a patient. Human anatomical models have been proposed using elastomeric compositions for human tissue. However, most elastomeric-based simulators that have previously been created do not include a level of detail that faithfully portrays the finer aspects of human tissue, including the tactile feel of different types of tissue. Commonly owned U.S. Pat. No. 6,780,016 discloses details of a human surgical trainer that provides very realistic tactile simulated tissue.

Even if a simulated physiological structure having simulated tissue faithfully portrays finer details of an actual physiological structure and provides a realistic tactile sensation during a simulated procedure, prior simulators do not include means for producing objective and measurable results that can be used to evaluate how well a simulated procedure is performed. Clearly, it would be desirable to employ a simulated physiological structure that is able to provide a realistic tactile sensation during a simulated procedure, and which is also able to provide an objective indication that can be used to evaluate how well a simulated procedure was executed.

One of the key requirements for such a simulator is that physically flexible electrical circuitry be included within the elastomeric material that represents tissue and other flexible organic elements, without changing the tactile characteristics of the elastomeric material. For example, flexible elastomeric conductive materials can be employed to produce flexible circuits that would be usable in a simulator. Sanders et al. (U.S. Pat. No. 5,609,615) discloses a cardiac simulator including an electrically conductive polymer. Thus, medical devices including electrically conductive polymers are known in the art. Indeed, other patents disclose the use of electrically conductive polymers in medical treatment devices (see for example: U.S. published patent application No. 2001/0000187 (Peckham et al.) describing prosthetics; U.S. Pat. No. 6,532,379 (Stratbucker) describing a defibrillator lead; U.S. Pat. No. 6,095,148 (Shastri et al.) describing a neural stimulator; U.S. Pat. No. 4,898,173 (Daglow et al.) describing an implantable electrical connector; PCT application WO 01/32249 (Geddes et al.) describing a tracheotrode; EPO application No. 0601806A2 (Moaddeb et al.) describing a cardiac stimulating electrode; and EPO application No. 0217689 (Compos) describing an ultrasound transducer). Each of the Toth references (U.S. Pat. Nos. 6,540,390; 6,436,035; and 6,270,491) discloses a surgical light that includes a user-actuatable switch that is constructed using conductive elastomers. Kanamori (U.S. Pat. No. 4,273,682) discloses a pressure sensitive conductive elastomer, but not in the context of a simulated physiological structure. Soukup et al. (U.S. Pat. No. 5,205,286) describes an implantable data port that employs an electrically conductive polymer to enable data to be conveyed from an implanted medical device or sensor to an externally disposed data dump. While the data port includes a conductive elastomer, the circuit does not provide evaluation data regarding a simulated procedure and is not part of a simulated physiological structure used for training purposes.

Commonly owned U.S. Pat. No. 8,556,635, discloses a nerve block trainer that includes conductive elastomers, which simulate the conductivity of human nerves. The function of the nerve block trainer is to train medical personnel to insert a needle properly when administering a nerve block. This training system uses a needle that is connected to a power source, and when the needle is inserted into the tissue and comes into contact with the conductive elastomer, it completes the circuit. The contact of the needle with conductive elastomers is interpreted by an electronic circuit that sends a signal to a personal computer (PC) through a Universal Serial Bus (USB) port. The signal is interpreted by software executing on the PC and is presented on the screen as a visual image of the targeted site that includes highlights on the screen indicating when the needle has come into contact with a specific targeted site.

While the use of conductive elastomers in a medical training simulator is very effective, there are certain training procedures relating to the insertion of a needle or contact between a different type of medical instrument with a simulated vessel that would be more effectively implemented by directly detecting when the needle or medical instrument actually contacts a fluid simulating blood being conveyed within the simulated vessel. For example, if the medical procedure requires that a needle be inserted into the internal jugular vein of the simulator, but not into its carotid artery, it would be desirable to be able to detect contact by the needle with the simulated blood in either of these vessels, and thereby, to determine if the person controlling the needle has inadvertently come into contact with or pierced the carotid artery or has failed to properly insert the needle into the jugular vein. Further, it would be desirable to provide a visual indication on a display screen or other human perceptible indication of what vessel (if any) the needle has pierced. A desirable indication might include showing graphic images of the jugular and the carotid artery on the display screen so that when a person has successfully inserted the needle into the jugular vein, the screen can show a green light to indicate success, or a red light if the needle has improperly pierced the carotid artery.

Earlier attempts to implement the use of a conductive fluid in a simulated vessel to detect contact between a needle or other medical instrument with the conductive fluid identified problems related to repeated use of such a medical trainer. It was found that a phantom circuit can occur after successive uses of this type of medical trainer. Specifically, after a needle is removed from a vessel in the trainer following a previous insertion, traces of the conductive fluid can exist in the channel that remains when the needle was previously withdrawn. Also, the conductive fluid in the simulated vessels can be at a positive pressure, so that the conductive fluid leaks from the simulated vessel through the channel created by the previous needle puncture. This leaking conductive fluid can remain on the surface of the medical trainer (i.e., on its simulated epidermis or other portions of the medical trainer that are not within the simulated vessels). During a subsequent training procedure, insertion of the needle through the simulated skin of the medical trainer may enable the needle to come into contact with any residual conductive fluid on the skin or other surfaces, or the needle may cross a previous path of insertion where there is residual conductive fluid. As a result, the circuit that is used to detect the vessel into which the needle has been inserted would detect a phantom circuit that is not the result of insertion of the medical device into one of the vessels, because of the contact of the needle with this residual conductive fluid on the surface or the residual fluid remaining in the previous insertion channel. Accordingly, it would be desirable to prevent such phantom circuit detections caused by contact of a needle or other medical instrument with conductive fluid that is not within the simulated vessels of the medical trainer.

It would also be desirable to employ a conductive fluid in a vessel to determine a position of a medical device in the vessel. For example, it would be desirable to determine where in a vessel filled with a conductive fluid that a needle pierced the vessel, or to determine where a medical instrument with a conductive tip had been advanced within a vessel filled with a conductive fluid.

SUMMARY

This application specifically incorporates by reference the disclosures and drawings of each patent application identified above as a related application.

In part, the following disclosure is directed an exemplary system for use in training a user such as medical personnel to insert a medical device to a desired target position within a body of a person undergoing a medical procedure. The system includes a medical trainer simulator that contains simulated body lumens and which simulates a portion of an actual body where the desired target position is disposed. At least one of the body lumens includes a conductive fluid simulating a bodily fluid is disposed at the desired target position within the medical training simulator. An electrical resistance measuring circuit is electrically coupled to the conductive fluid in the simulated body lumens and to the medical device that is to be inserted. The electrical resistance measuring circuit produces an output signal indicative of an electrical resistance between the medical device and the conductive fluid. A computing device that includes a display executes machine executable instructions causing the computing device to carry out a plurality of functions. These functions include monitoring the output signal to detect if any electrical current is flowing between the medical device and the conductive fluid in the at least one simulated body lumen, and as a function of the electrical current that is detected, determining the electrical resistance between the medical device and the conductive fluid. The computing device then determines if a magnitude of the electrical resistance is at or below a predetermined threshold for a simulated body lumen in which the desired target position is disposed. The predetermined threshold is selected to indicate whether the medical device has been inserted and advanced into the medical training simulator to the desired target position. If the magnitude of the resistance is less than or equal to the predetermined threshold, the computing device indicates on the display that the user has successfully inserted and advanced the medical device into the simulated body lumen to the desired target position.

Another aspect of this disclosure is directed to an exemplary method for training a user to insert a medical device to a desired target position within a body of a person undergoing a medical procedure, using a medical trainer simulator. The method is implemented in a manner that is generally consistent with the functions performed by the elements of the system discussed above.

This Summary has been provided to introduce a few concepts in a simplified form that are further described in detail below in the Description. However, this Summary is not intended to identify key or essential features of the claimed subject matter, nor is it intended to be used as an aid in determining the scope of the claimed subject matter.

DRAWINGS

Figure 2:
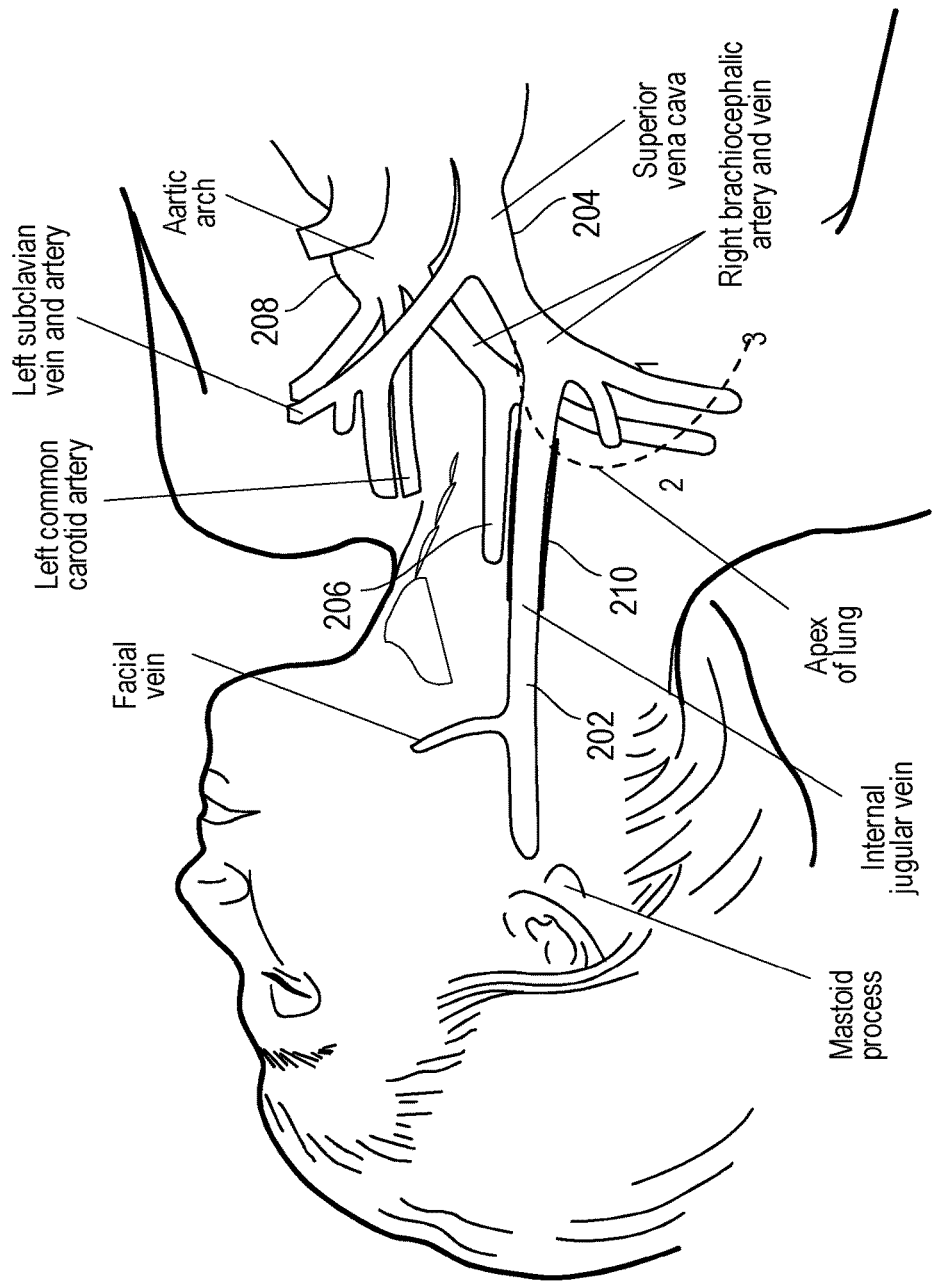
Figure 3:
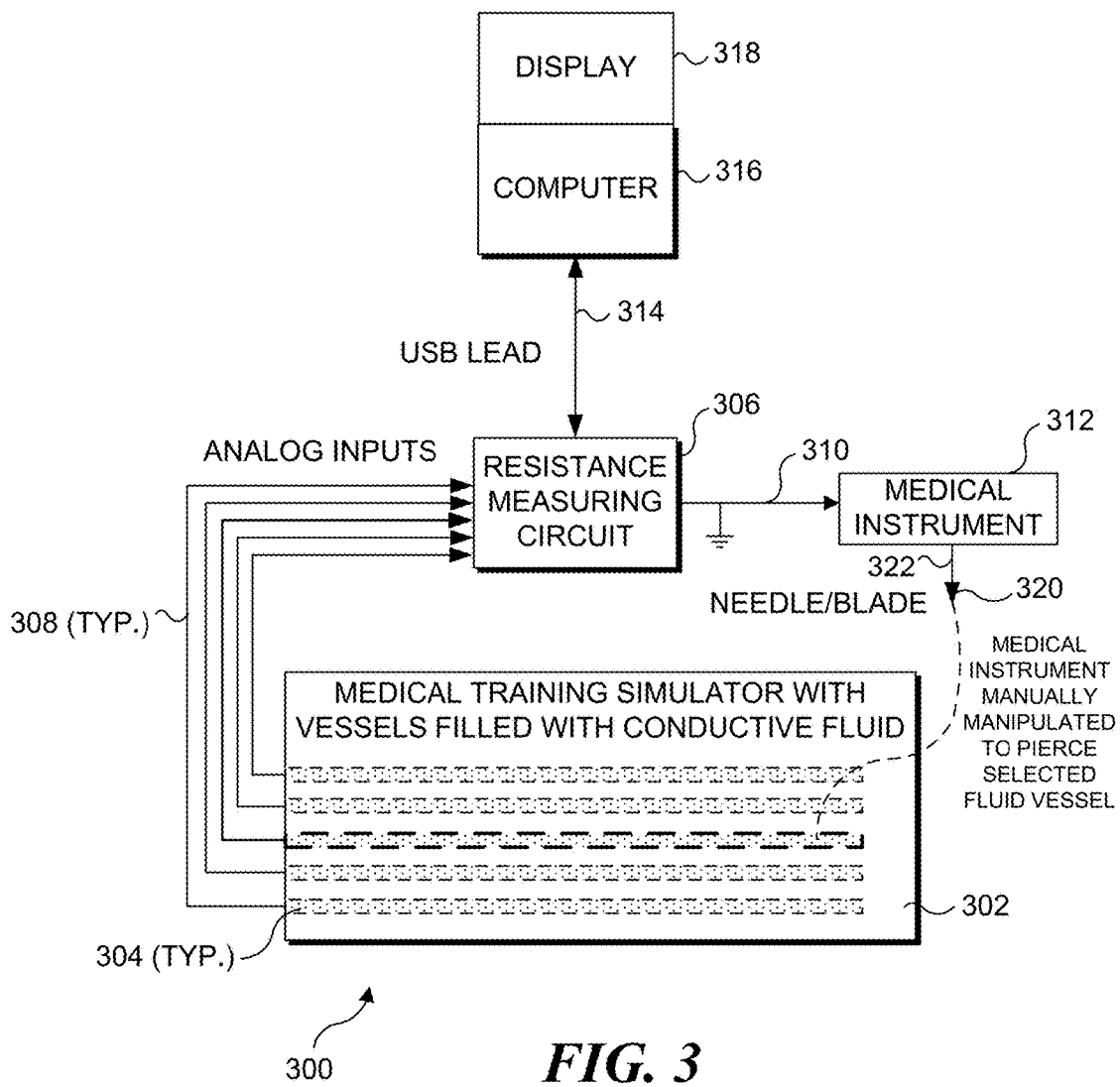
Figure 7:
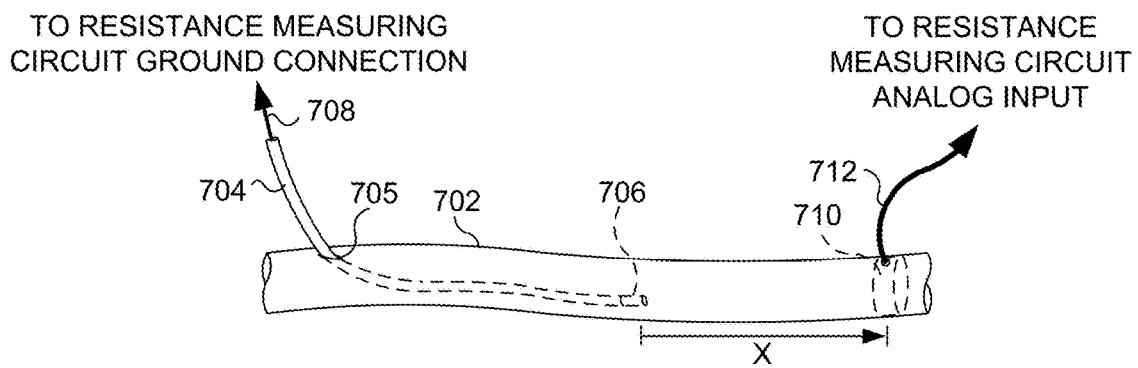
Figure 4:
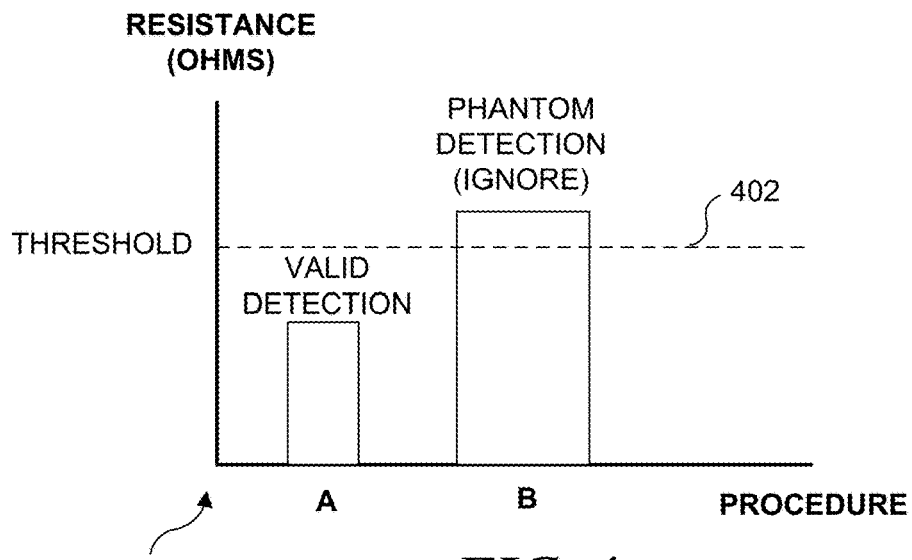
Figure 5:
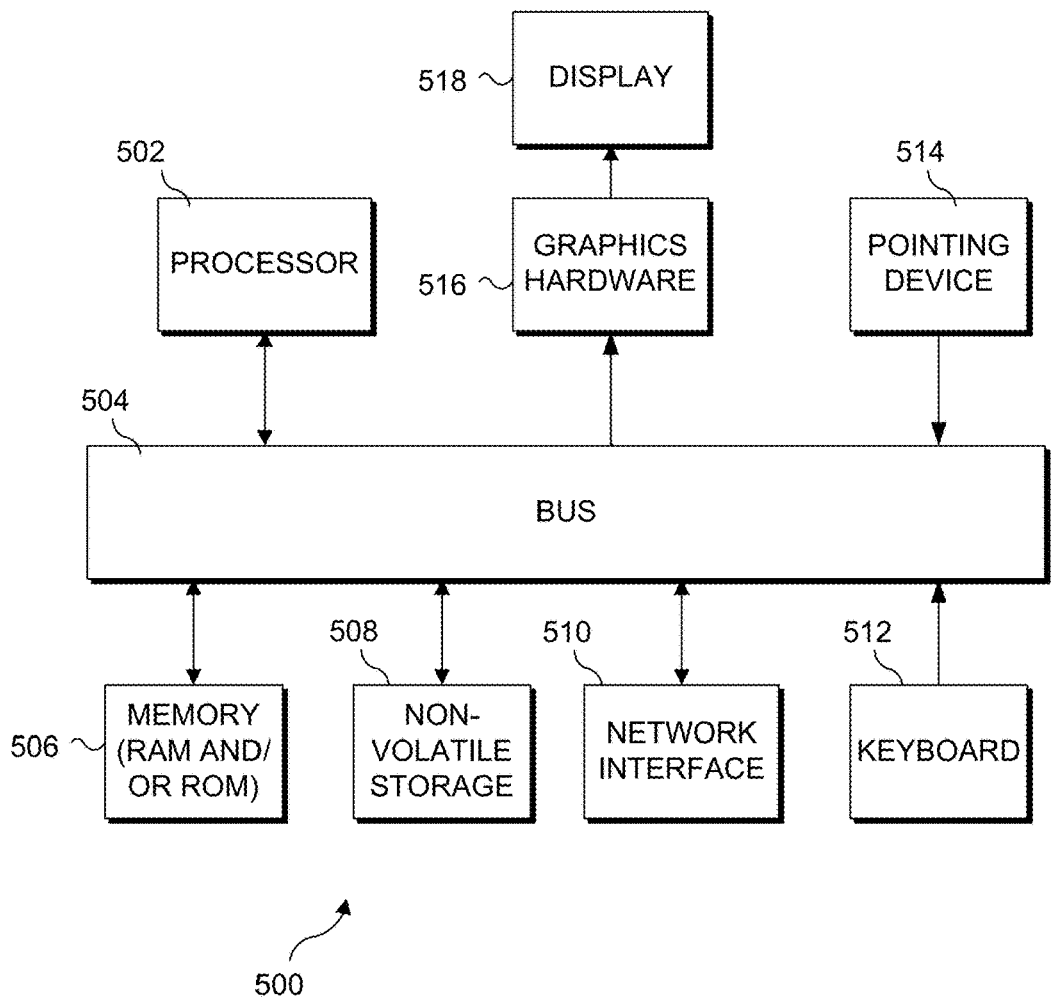
Figure 6:
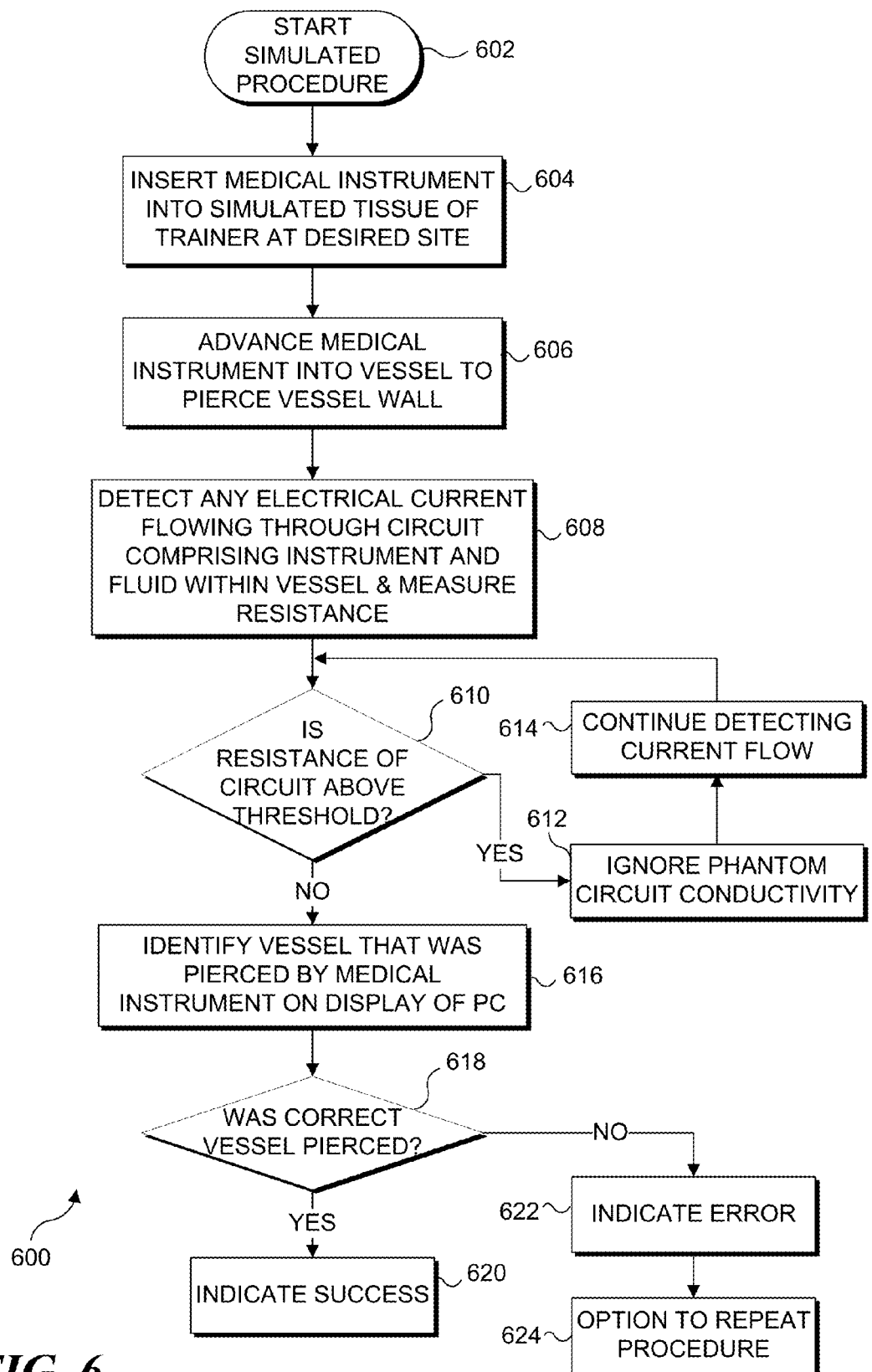

Various aspects and attendant advantages of one or more exemplary embodiments and modifications thereto will become more readily appreciated as the same becomes better understood by reference to the following detailed description, when taken in conjunction with the accompanying drawings, wherein:

FIG. 1 is an image illustrating an exemplary medical trainer simulator that includes simulated arteries and veins (not visible) filled with conductive fluid, and which is electrically coupled to a personal computer;

FIG. 2 is a graphic image showing internal arteries and veins coupled to a portion of a heart, to indicate how the medical trainer simulator of FIG. 1 can be used to conduct a training procedure in which a person is expected to pierce a specific vessel, such as the jugular vein, with a syringe (or other medical instrument), and then to visually indicate whether the person has been successful in performing the procedure;

FIG. 3 is a schematic block diagram illustrating the functional components of the medical trainer simulator of FIGS. 1 and 2 and showing how the components are coupled together to form a circuit that can be detected when a medical instrument has pierced one of the vessels in the medical trainer simulator that is filled with a conductive fluid;

FIG. 4 is a graph showing how an exemplary threshold resistance of a connection between the conductive fluid in or on the medical trainer of FIGS. 1-3 and a medical device is used to determine if the circuit formed thereby represents merely a phantom connection where the medical device has contacted residual conductive fluid from a previous procedure or is due to the medical instrument actually contacting the conductive fluid within a vessel in the medical trainer simulator;

FIG. 5 is a schematic block diagram of a generally typical computing device, such as a personal computer (PC), or laptop like that shown in FIGS. 1 and 3, which is useful in evaluating the procedure being conducted with the medical trainer simulator;

FIG. 6 is a flowchart showing exemplary logic for evaluating the success of a medical procedure being carried out with the medical trainer shown in FIGS. 1, 3, and 5; and FIG. 7 is a schematic elevational view of a portion of simulated vessel within the medical trainer simulator in which a catheter has been advanced, a distal end of the catheter being a conductor whose position can be sensed relative to the resistance of the conductive fluid in contact with it.

DESCRIPTION

Figures and Disclosed Embodiments are not Limiting

Exemplary embodiments are illustrated in referenced Figures of the drawings. It is intended that the embodiments and Figures disclosed herein are to be considered illustrative rather than restrictive. No limitation on the scope of the technology and of the claims that follow is to be imputed to the examples shown in the drawings and discussed herein. Further, it should be understood that any feature of one embodiment disclosed herein can be combined with one or more features of any other embodiment that is disclosed, unless otherwise indicated.

Overview of Medical Trainer Simulator System Using Conductive Fluid-Filled Vessels An exemplary medical trainer simulator system 100 is illustrated in a photographic image shown in FIG. 1. Medical trainer simulator system 100 includes a medical trainer simulator 102 corresponding to the upper chest portion of a simulated human male torso. Details of the internal structure of medical trainer simulator system 100 are not specifically discussed or shown herein. However, the simulated layers of the medical trainer are fully disclosed in the commonly owned patents, the specification and drawings of which are hereby specifically incorporated by reference herein. The structure of the medical trainer simulator enables it to realistically replicate the actual feel that would be expected when cutting into replaceable portions of the simulator with a scalpel, or when advancing a needle into a simulated vessel included within it. It should be noted that the term "vessels" as used herein is intended to encompass both simulated arteries and simulated veins, as well as other types of simulated body lumens, where it is desirable to determine if a medical instrument has been inserted into the simulated body lumen.

As shown in FIG. 1, a replaceable tissue module 104 covers an upper portion of the medical trainer simulator, where vessels corresponding to veins and arteries that are of potential interest in simulating an exemplary medical procedure are disposed. These veins and arteries are not visible in the photograph of this Figure, since they are covered by the replaceable tissue module, but in this example, they include at least a simulated internal jugular vein and a simulated carotid artery. Fluid lines 106 and 108 are provided to convey conductive fluid that simulates blood into a plurality of simulated vessels within medical trainer simulator 102. The exposed ends of fluid lines 106 and 108 include fluid push-on connector 110 and 112, which can be connected to a pressurized source of the conductive fluid or to a hand manipulated pulsitile squeeze bulb (neither shown) that can be manually compressed to simulate a pulse.

Disposed within medical trainer simulator 102 is an internal circuit board assembly 114 (represented by a black rectangular outline). In the exemplary embodiment discussed herein, the internal circuit board that is employed is an ARDUINO UNO R3™ microcontroller board that includes a plurality of digital input/output pins, and a plurality of analog inputs. It will be understood that many other types and models of circuit boards (either internal or external to the medical trainer simulator) can be employed in this application for computing the resistance of any of a plurality of circuits formed by contact between a medical instrument and a conductive fluid. A lead 116 couples the analog inputs to each of a plurality of internal simulated vessels comprising veins and arteries disposed within medical trainer simulator 102 (and thus, not visible). The electrical conductors within lead 116 are each electrically in contact with a conductive fluid in different ones of these vessels, so that each vessel can be included in a separate circuit if the conductive fluid in the vessel contacts a medical instrument manipulated by a person carrying out a training procedure. Also, a ground line in a lead 118 is connected between a ground connection on internal circuit board 114 and a needle adapter 130 that is coupled to a syringe 132, in this example.

It will be understood that although the present approach will typically be used to determine when the needle of a syringe, such as syringe 132, contacts a conductive fluid within one of the vessels in medical trainer simulator 102, it can also be used in connection with other types of medical instruments, such as scalpels, to determine when any such medical instrument has contacted a conductive fluid in a vessel disposed within the medical trainer simulator. Further, although medical trainer simulator 102 is shown as an upper torso in this exemplary embodiment, it will be understood that a medical trainer simulator can encompass other portions of a simulated human body or may comprise an entire simulated human body.

An output signal from internal circuit board 114 is conveyed by a cable 120 to a USB input port 122 on a laptop 124. The USB input port also provides a 5 volt direct current (DC) voltage that is employed to energize internal circuit board 114. Alternatively, an external power supply (not shown) can instead be used for this purpose. The output signal from the internal circuit board that is supplied to laptop 124 is processed by software executing on the laptop to determine which vessel (if any) contains the conductive fluid that has come into contact with the medical instrument during the procedure. In addition, as discussed below, the logic implemented by software executing on the laptop is used to exclude phantom circuits that occur when the medical instrument (e.g., a syringe needle) has contacted residual conductive fluid remaining within a puncture channel from a previous procedure, or conductive fluid that has leaked through such a channel and is now on a surface of the medical trainer simulator. It was found to be important that the laptop not respond to such phantom circuits, since the results of the procedure can be in error if such phantom circuit contacts with the conductive fluid by the medical instrument are not excluded.

Laptop 124 is shown in this exemplary embodiment and includes a generally conventional keyboard 124, a touchpad 126, and a display 128 on which a graphic image corresponding to that shown in FIG. 2 is provided, as discussed below. It must be emphasized that other types of computing devices, such as desktop computers, servers, and tablets, to name a few by way of example and without any intended limitation, can be used in the present approach to implement the logic used to determine which vessel (if any) contains conductive fluid that has come into contact with the medical instrument during the procedure and to exclude phantom circuits, as discussed herein. As a further alternative, hardware logic circuits, or application specific integrated circuits (ASICs) can be employed to implement the detection of the vessel and exclusion of phantom circuits.

A graphic image 200 is illustrated in FIG. 2, to show an example of what can be provided on display 128 of the laptop or other type of PC that is used in this approach. In the exemplary procedure being conducted with medical trainer simulator 102, a person using the medical trainer is intended to manipulate a syringe so that the needle on the syringe pierces a simulated internal jugular vein 202, which is connected to superior vena cava 204 (as shown in the graphic image). A potential error would occur if the person advancing the needle into the medical trainer simulator instead pierced carotid artery 206, which extends from aortic arch 208. If the person is successful in piercing jugular vein 202 with the needle or other type of medical instrument, the display will indicate that result by illuminating green bars 210 on each side of the jugular vein where the needle pierced it. However, if the needle instead pierces carotid artery 206, the display can illuminate red bars (not shown) on each side of the carotid artery where it was pierced. Optionally (or alternatively), an appropriate audio indication can be provided by the laptop or other type of PC that is used to indicate whether the procedure was correctly or improperly completed.

A schematic diagram 300 shown in FIG. 3 illustrates how the functional components of the present exemplary system are coupled together to detect when a medical instrument such as needle has contacted the conductive fluid within a simulated vessel of the medical trainer simulator. As shown in this Figure, a block 302 represents the medical training simulator. Block 302 includes a plurality of simulated vessels 304, e.g., simulated arteries and veins, which are filled with a conductive fluid that can be dyed red to simulate real blood. The conductive fluid used in this exemplary embodiment comprises about a 1% saline solution to provide the desired electrical conductivity. However, other types of conductive additives, e.g., other salts or other conductive chemicals, can be employed in the alternative. A block 306 comprises a resistance measuring circuit, such as internal circuit board 114, which is shown in FIG. 1. A plurality of conductive lines 308 connects the conductive fluid in each simulated vessel 304 to separate analog inputs on resistance measuring circuit 306. A ground line 310 from the resistance measuring circuit is connected to a medical instrument 312, which may comprise a needle or blade 320, through contact with a conductive portion 322. The medical instrument is manipulated by a person performing the medical procedure so that the needle or blade pierces a selected one of simulated vessels 304. The selected vessel is indicated by the darker dash lines defining one of the vessels in FIG. 3. Current from resistance measuring circuit 306 flows through ground line 310 to medical instrument 312, and through needle or blade 320 into the conductive fluid of the vessel that has been pierced or excised by the needle or blade. The conductive fluid in that vessel that has come into contact with the medical instrument manipulated by the person performing the procedure then conveys the electrical current into a conductive line 308 that is connected to the conductive fluid, to one of the analog inputs of resistance measuring circuit 306. Based on the voltage drop through the circuit thus created and the magnitude of the current, the resistance measuring circuit determines the resistance of the circuit. This resistance value is then conveyed as a digital signal through USB lead 314 to a computer (e.g., laptop 122 shown in FIG. 1). The computer executes a software program to determine whether the medical instrument has pierced or cut the intended vessel and to exclude phantom circuits that are the result of the medical instrument contacting conductive fluid in a channel created by a previous procedure or contacting conductive fluid on a surface or other portion of the medical training simulator that is not in any of the vessels. The status of the procedure result is then shown on a display 318 that is coupled to computer 316, for example, as discussed above in connection with display 128 (FIG. 1), which includes graphic image 200 (FIG. 2).

Through empirical testing, it was determined that if the resistance of a circuit completed through the medical instrument and conductive fluid exceeds a threshold level, the circuit could be deemed a phantom circuit, since it was the result of contact between the medical instrument and residual conductive fluid either in a channel created during a previous procedure, or conductive fluid that has leaked onto an external (or other) surface of the medical trainer simulator. FIG. 4 is an exemplary graph 400 that shows a threshold level 402, which was thus determined to be a maximum acceptable resistance value. A procedure A shown on graph 400 has been determined by the computer to be a valid detection of a contact between the medical instrument and conductive fluid within one of the simulated vessels, since the resistance of the resulting electrical circuit is less than predefined threshold 402. In contrast, the logic implemented by the computer determines that a procedure B should be ignored as a phantom detection of contact between the medical instrument and conductive fluid, since the resistance of the resulting circuit exceeds predefined threshold 402.

A general purpose computing device can be employed to identify the vessel that has been pierced or excised by the medical instrument, causing the medical instrument to contact the conductive fluid within the vessel, and to exclude phantom circuits where contact occurs between the medical instrument and conductive fluid that is not within one of the vessels. A block diagram 500 illustrates exemplary functional components of such a general purpose computing device, which includes a processor 502. Processor 502 is coupled to a data bus 504, as is a memory 506 that includes both random access memory (RAM) and read only memory (ROM). A non-volatile storage 508 is also coupled to data bus 504 and can store data and executable software programs and modules, including the software executed to perform the logic employed in connection with identifying a vessel in the medical trainer simulator that has been pierced or excised by the medical instrument, and for excluding phantom circuits, as discussed above. Optionally, a network interface 510 can be connected to data bus 504, to enable bi-directional communication with one or more wide area networks, and/or local area networks, and/or the Internet. A keyboard 512 coupled to data bus 504 enables input of text, commands, and selections that are used to control processor 502. Similarly, a pointing device, such as a mouse, keypad, touchpad, trackball, etc. can be coupled to the data bus to enable the user to control a cursor position, and to make selections and designate control options. A graphics hardware interface 516 couples data bus 504 to a display 518 on which text and graphics can be presented. Software instructions controlling the logic implemented when executed by processor 502 can be loaded into memory 506 from a non-transient storage medium that stores the software instructions. Examples of such non-transient storage media without any intended limitation include magnetic disks, electronic memory such as USB memory sticks, compact disks (CDs), and digital video disks (DVDs). While not specifically shown in FIG. 5, it will be understood that such non-transient media can be included in or represented by non-volatile storage 508 in FIG. 5.

An example of the logic implemented by computer 316, laptop 122, or other form of computing device that is employed in the present novel approach is illustrated by a flowchart 600 shown in FIG. 6. Flowchart 600 begins with a block 602 corresponding to the start of the simulated procedure being performed with the medical trainer simulator. A block 604 provides for the person performing the procedure to insert a medical instrument, e.g., a needle of a syringe, into the simulated tissue of the medical trainer simulator, at a selected site. Selecting the appropriate point at which to insert the medical instrument is one of the key elements of the training procedure, since insertion at an improper point may result in the medical instrument being advanced to pierce or excise the wrong vessel. The advancement of medical instrument into a vessel is indicated in a block 606. Next, in a block 606, internal circuit board 114 (or resistance measuring circuit 306) detects any electrical current flowing through a circuit preferably comprising the medical instrument and the conductive fluid within a vessel pierced or excised by the medical instrument, and measures the resistance of the circuit conveying the current. However, the logic must also determine if a phantom circuit has been detected, which results from contact between the medical instrument and conductive fluid that is not within one of the simulated vessels. Accordingly, a decision block 610 determines if the resistance is above predetermined threshold 402 discussed in connection with graph 400 in FIG. 4. If so, a block 612 provides for ignoring the phantom circuit conductivity. A block 614 then provides for continuing detecting any electrical current flow between the medical instrument and the conductive fluid and returns to decision block 610.

If the result of decision block 610 is negative, i.e., the resistance measured is less than the predetermined threshold, then a block 616 identifies the vessel that was pierced (or excised) by the medical instrument. A decision block 618 determines if the vessel that was pierced is the correct one, i.e., if the person performing the procedure correctly pierced the intended vessel rather than one of the other vessels. If the correct vessel was pierced (or excised), a block 620 then provides that the computer indicates success, e.g., by visually displaying the portion of the correct vessel that was pierced using a visual indicator such as a green (or other color) light and/or by providing an audible signal to indicate that the correct vessel was pierce (or excised). If the wrong vessel was pierced or excised, a block 622 provides that the computer indicate an error has occurred, for example, as discussed above. Thereafter, a block 624 offers the option to repeat the procedure.

Alternative Application of Technology

An electrode location at which resistance measuring circuit 306 (shown in FIG. 3) is electrically coupled to the conductive fluid in a simulated vessel can be employed to determine a location of a medical instrument within a vessel relative to the separation between the electrode and the medical instrument within the simulated vessel. Specifically, by measuring the resistance of the circuit formed by the medical instrument exposed to the conductive fluid in a simulated vessel and the electrode via the conductive fluid, and changes to the resistance as the medical instrument is moved within the simulated vessel, it is possible for the computer to use resistance measuring circuit 306 to determine the proximity of a medical instrument or device relative to a target position (where the electrode is disposed) inside the simulated vessel filled with the conductive fluid.

For example, as shown in a schematic diagram 700 in FIG. 7, a simulated vessel 702 that is filled with a conductive fluid can be used for training medical personnel to insert a cardiac catheter 704 into simulated vessel 702 and to advance the catheter, so that it is deployed proximate to a targeted position within the simulated vessel. By using the same circuitry illustrated in FIG. 3, resistance measuring circuit 306 can determine the resistance of the circuit created when the cardiac catheter is inserted into the conductive fluid in the simulated vessel through a small incision 705 created in the wall of the simulated catheter.

Cardiac catheter 704 can then be advanced toward the target position, which changes the resistance of this circuit, as follows. A conductive tip 706 is formed at the distal end of cardiac catheter 704 (the remainder of the cardiac catheter is non-conductive) and is coupled to the resistance measuring circuit through a conductive lead 708 that extends from the conductive tip through the cardiac catheter and is connected to the ground connection of the resistance measuring circuit. The target location within simulated vessel 702 corresponds to a position where an internal electrode ring 710 is disposed inside the simulated vessel, in electrical contact with the conductive fluid contained in the simulated vessel. Internal electrode ring 710 is connected through an electrically conductive lead 712 to one of the analog inputs of the resistance measuring circuit. As conductive tip 706 is moved through simulated vessel 702, closer to the target location of internal electrode ring 710, the resistance to the electrical current flowing between conductive tip 706 and internal electrode ring 710 through the conductive fluid continues to drop until conductive tip 706 on the cardiac catheter is proximal to the target location at internal electrode ring 710, where the resistance decreases to a predetermined specific minimum threshold value (which can be empirically determined). This exemplary embodiment enables an instructor and/or the person performing the procedure to determine whether the tip of the cardiac catheter has been deployed to the right location, based on an indication provided on the display coupled to laptop 122 (or computer 316).

It should also be noted that this same approach can be employed to determine a relative separation between other types of medical instruments and a target location within a simulated vessel. For example, the relative position or separation between a needle that is inserted into the simulated vessel and the target location where the internal electrode ring is disposed can be determined approximately based on the actual magnitude of the resistance of the circuit formed by the needle, the conductive fluid, and the internal electrode ring. If the magnitude is less than a second predetermined resistance threshold, it can be concluded that the needle or other medical instrument has contacted the conductive fluid within a simulated vessel within an acceptable distance from the targeted location where the internal electrode ring is disposed.

The modification to flowchart 600 in FIG. 6 that would be required so that the logic encompasses the alternative application described above would require that another decision block be added between decision block 618 and block 620 to determine if the resistance that has been measured is less than or equal to a predetermined minimum threshold value that corresponds to the medical instrument being within an acceptable separation distance from the target location where the internal electrode ring is disposed. If not, the logic would loop back to block 608. Alternatively, if the result of this decision is affirmative, a new block added to flowchart 600 would provide that the display indicate that the medical instrument is proximate to the target location.

Although the concepts disclosed herein have been described in connection with the preferred form of practicing them and modifications thereto, those of ordinary skill in the art will understand that many other modifications can be made thereto within the scope of the claims that follow. Accordingly, it is not intended that the scope of these concepts in any way be limited by the above description, but instead be determined entirely by reference to the claims that follow.

The invention in which an exclusive right is claimed is defined by the following:

1. A system for training a user to insert a medical device to a desired target position within a body of a person undergoing a medical procedure, comprising:
    (a) a medical trainer simulator that contains at least one simulated body lumens and which simulates a portion of an actual body where the desired target position is disposed, one or more of the at least one simulated body lumens including a conductive fluid simulating a bodily fluid being disposed at the desired target position within the medical training simulator;
    (b) an electrical resistance measuring circuit that is electrically coupled to the conductive fluid contained in the at least one of the simulated body lumens and to the medical device that is to be inserted, the electrical resistance measuring circuit configured to produce an output signal indicative of an electrical resistance between the medical device and the conductive fluid;
    (c) a computing device including a processor and machine executable instructions that when executed by the processor cause the computer to: receive and monitor the output signal from the electrical resistance measuring circuit, to determine if the medical device has been inserted into the at least one simulated body lumen in which the desired target position is disposed based on the output signal received, and to provide a human perceptible indication when the medical device has been inserted into the at least one simulated body lumen in which the desired target position is disposed.

2. The system of claim 1, wherein the machine executable instructions executed by the computing device are configured to further cause the computing device to carry out a plurality of functions, including:
    (a) based on the output signal, detecting if electrical current is flowing between the medical device and the conductive fluid in the at least one simulated body lumen;
    (b) as a function of the electrical current that is detected, determining a magnitude of an electrical resistance between the medical device and the conductive fluid;
    (c) determining if the magnitude of the electrical resistance is less than or equal to a predetermined threshold for the at least one simulated body lumen in which the desired target position is disposed, the predetermined threshold being selected to indicate whether the medical device has been inserted and advanced into the medical training simulator to the desired target position within the at least one simulated body lumen; and
    (d) if the magnitude of the electrical resistance is less than or equal to the predetermined threshold, indicating by a human perceptible indication that the user has successfully inserted the medical device into the at least one simulated body lumen.

3. The system of claim 1, wherein the medical device comprises at least one of:
    (a) a needle;
    (b) a scalpel; or
    (c) a catheter.

4. The system of claim 1, wherein a plurality of the one or more simulated body lumens contain the conductive fluid, and wherein the electrical resistance measuring circuit is separately electrically coupled to the conductive fluid in each of the plurality of the one or more simulated body lumens so as to produce a plurality of output signals, each output signal being indicative of the electrical resistance between the medical device and the conductive fluid in a different one of the plurality of simulated body lumens.

5. The system of claim 4, wherein the machine executable instructions executed by the computing device are configured to further cause the computing device to monitor and respond to the plurality of output signals, and to determine whether the medical device has been inserted into an incorrect simulated body lumen that does not include the desired target position, based in part, on determining if electrical resistance between the conductive fluid in any of the plurality of simulated body lumen that does not include the desired target position and the medical device is less than or equal to a predetermined threshold.

6. The system of claim 5, wherein if the computing device determines that the medical device has been inserted into an incorrect simulated body lumen that does not include the desired target position, the machine executable instructions executed by the computing device are configured to cause the computing device to indicate by a human perceptible indication that the medical device has been improperly inserted into an incorrect simulated body lumen.

7. The system of claim 1, further comprising an electrode coupled to the electrical resistance measuring circuit and disposed proximate to the desired target position in the at least one simulated body lumen so that the electrode is exposed to the conductive fluid within the at least one simulated body lumen, the output signal produced by the electrical resistance measuring circuit indicating a decreasing electrical resistance between the medical device and the electrode as the medical device inserted into the at least one simulated body lumen is advanced within the simulated body lumen toward the electrode.

8. The system of claim 7, wherein the machine executable instructions executed by the computing device are configured to further cause the computing device to track the medical device as the medical device is advanced toward the desired target position within the at least one simulated body lumen and to indicate on a display a relative distance between the medical device and the desired target position as a function of the electrical resistance between the medical device and the electrode within the at least one simulated body lumen.

9. The system of claim 7, wherein the medical device comprises a catheter having a conductive tip disposed at a distal end of the catheter, the conductive tip being coupled to the electrical resistance measuring circuit, and wherein the machine executable instructions executed by the computing device are configured to further cause the computing device to indicate on a display that the distal end of the catheter has been advanced within the at least one simulated body lumen to a position sufficiently close to the desired target position so as to be considered a successful insertion of the catheter by the user, based upon a comparison of a magnitude of the electrical resistance with a predetermined threshold.

10. The system of claim 1, wherein the machine instructions executed by the computing device further cause the computing device to determine whether the medical device has contacted conductive fluid that is not located within at least one of the simulated body lumen.

11. A method for training a user to insert a medical device to a desired target position within a body of a person undergoing a medical procedure, the method comprising:
(a) providing a medical trainer simulator that contains at least one simulated body lumens and which simulates a portion of an actual body where the desired target position is disposed, one or more of the at least one simulated body lumens including a conductive fluid simulating a bodily fluid being disposed at the desired target position within the medical training simulator;
(b) receiving and monitoring, by a computing device, an output signal from an electrical resistance measuring circuit, the computing device including a processor and machine executable instructions, the electrical resistance measuring circuit being electrically coupled to the conductive fluid contained in the at least one of the simulated body lumens and to the medical device that is to be inserted, wherein the electrical resistance measuring circuit is configured to produce an output signal indicative of an electrical resistance between the medical device and the conductive fluid; and
(c) determining, by the computing device, that the medical device has been inserted into the at least one simulated body lumen in which the desired target position is disposed based on the output signal received, and to provide a human perceptible indication when the medical device has been inserted into the at least one simulated body lumen in which the desired target position is disposed; and
(d) providing a human perceptible indication when the medical device has been inserted into the at least one simulated body lumen in which the desired target position is disposed.

12. The method of claim 11, further comprising:
(a) detecting, by the computer system monitoring the output signal, electrical current flowing between the medical device and the conductive fluid in the at least one simulated body lumen;
(b) determining, by the computer system, a magnitude of an electrical resistance between the medical device and the conductive fluid, the magnitude of the electrical resistance being a function of the electrical current that is detected;
(c) determining, by the computer system, that the magnitude of the electrical resistance is less than or equal to a predetermined threshold for the at least one simulated body lumen in which the desired target position is disposed, the predetermined threshold being selected to indicate whether the medical device has been inserted and advanced into the medical training simulator to the desired target position within the at least one simulated body lumen; and
(d) indicating by a human perceptible indication that the user has successfully inserted the medical device into the at least one simulated body lumen.

13. The method of claim 11, wherein the medical device comprises at least one of:
(a) a needle;
(b) a scalpel; or
(c) a catheter.

14. The method of claim 11, wherein a plurality of the one or more simulated body lumens contain the conductive fluid, and wherein the electrical resistance measuring circuit is separately electrically coupled to the conductive fluid in each of the plurality of the one or more simulated body lumens so as to produce a plurality of output signals, each output signal being indicative of the electrical resistance between the medical device and the conductive fluid in a different one of the plurality of simulated body lumens.

15. The method of claim 14, further comprising:
monitoring, by the computing device the plurality of output signals;
determining, by the computing device, that an electrical resistance between the conductive fluid in any of the plurality of simulated body lumen that does not include the desired target position and the medical device is less than or equal to a predetermined threshold; and
determining, by the computing device, that the medical device has been inserted into an incorrect simulated body lumen that does not include the desired target position.

16. The method of claim 15, further comprising indicating, by the computing device generating a human perceptible indication, that the medical device has been improperly inserted into an incorrect simulated body lumen.

17. The method of claim 11, further comprising:
exposing an electrode to the conductive fluid within the at least one simulated body lumen, the electrode being coupled to the electrical resistance measuring circuit and disposed proximate to the desired target position in the at least one simulated body lumen; and wherein the output signal produced by the electrical resistance measuring circuit indicates a decreasing electrical resistance between the medical device and the electrode as the medical device inserted into the at least one simulated body lumen is successfully advanced within the simulated body lumen toward the electrode.

18. The method of claim 17, further comprising:
tracking, by the computing device, the medical device as the medical device is advanced toward the desired target position within the at least one simulated body lumen; and
indicating on a display a relative distance between the medical device and the desired target position as a function of the electrical resistance between the medical device and the electrode within the at least one simulated body lumen.

19. The method of claim 17, wherein the medical device comprises a catheter having a conductive tip disposed at a distal end of the catheter, the conductive tip being coupled to the electrical resistance measuring circuit, the method further comprising:
comparing a magnitude of the electrical resistance with a predetermined threshold to generate a comparison; and
indicating, by the computing device, on a display that a distal end of the catheter has been advanced within the at least one simulated body lumen to a position sufficiently close to the desired target position so as to be considered a successful insertion of the catheter by the user, wherein the indicating is based is the comparison.

20. The method of claim 11, further comprising: determining, by the computing device, that the medical device has contacted conductive fluid that is not located within at least one of the simulated body lumen.

* * * * *